United States Patent [19]

Watzke et al.

[11] Patent Number: 5,736,476
[45] Date of Patent: Apr. 7, 1998

[54] BOROSILICATE GLASS OF HIGH CHEMICAL RESISTANCE AND LOW VISCOSITY WHICH CONTAINS ZIRCONIUM OXIDE AND LITHIUM OXIDE

[75] Inventors: Eckhart Watzke; Andrea Kämpfer, both of Jena; Peter Brix, Mainz; Franz Ott, Mitterteich, all of Germany

[73] Assignee: Schott Rohrglas GmbH, Bayreuth, Germany

[21] Appl. No.: 722,668

[22] Filed: Sep. 30, 1996

[30] Foreign Application Priority Data

Sep. 30, 1995 [DE] Germany .................. 195 36 708.1

[51] Int. Cl.$^6$ ............................................. C03C 3/093
[52] U.S. Cl. ............................................. 501/67; 501/66
[58] Field of Search ........................................ 501/66, 67

[56] References Cited

U.S. PATENT DOCUMENTS

| | | | |
|---|---|---|---|
| 4,259,118 | 3/1981 | Sack | 501/67 |
| 4,386,164 | 5/1983 | Moser | 501/66 |
| 4,870,034 | 9/1989 | Kiefer | 501/66 |
| 5,017,521 | 5/1991 | Yale et al. | 501/64 |
| 5,219,801 | 6/1993 | Shorrock et al. | 501/65 |
| 5,459,110 | 10/1995 | Brix | 501/67 |
| 5,525,553 | 6/1996 | Brocheton et al. | 501/64 |
| 5,599,753 | 2/1997 | Watzke et al. | 501/66 |
| 5,610,108 | 3/1997 | Watzke et al. | 501/59 |

FOREIGN PATENT DOCUMENTS

| | | |
|---|---|---|
| 0297255 | 1/1989 | European Pat. Off. . |
| 0699636 | 3/1996 | European Pat. Off. . |
| 2756555 | 6/1979 | Germany . |
| 301821 | 5/1992 | Germany . |
| 4230607 | 1/1994 | Germany . |

*Primary Examiner*—Mark L. Bell
*Assistant Examiner*—Louis M. Troilo
*Attorney, Agent, or Firm*—Walter Ottesen

[57] ABSTRACT

The invention relates to a borosilicate glass of high chemical resistance and low viscosity which contains zirconium oxide and lithium oxide. The borosilicate glass has hydrolytic resistance (in accordance with DIN ISO 719), class 1 acid resistance (in accordance with DIN 12116), and class 1 alkali resistance (in accordance with DIN ISO 659), and with a low operating temperature $V_A$ of between 1180° C. to 1230° C. and a coefficient of thermal expansion $\alpha_{20/300}$ of $4.9 \times 10^{-6}$ K$^{-1}$. The borosilicate glass has the composition (in % by weight, based on oxide): $SiO_2$ 73–75; $B_2O_3$ 7–10; $Al_2O_3$ 5–7; $ZrO_2$ 1–3; $Li_2O$ 0.5–1.5; $Na_2O$ 0–10; $K_2O$ 0–10; $MgO$ 0–3; $CaO$ 0–3; $BaO$ 0–3; $SrO$ 0–3; $ZnO$ 0–3; ratio of $SiO_2/B_2O_3 \geq 7.5$; $\Sigma\ SiO_2+Al_2O_3+ZrO_2$ 80–83 and $\Sigma\ MgO+CaO+BaO+SrO+ZnO \leq 3$, and fluorides 0–3. The glass is particularly suitable for use as a versatile primary packaging material for pharmaceuticals, for example as ampule glass.

6 Claims, No Drawings

BOROSILICATE GLASS OF HIGH CHEMICAL RESISTANCE AND LOW VISCOSITY WHICH CONTAINS ZIRCONIUM OXIDE AND LITHIUM OXIDE

FIELD OF THE INVENTION

The invention relates to a borosilicate glass which contains zirconium oxide and lithium oxide and has class 1 hydrolyric resistance, acid resistance and alkali resistance. The borosilicate glass of the invention has a low viscosity, in particular in the processing range.

BACKGROUND OF THE INVENTION

For use as primary packaging material, for example, as ampule glass, the pharmaceutical industry requires glasses having extremely high chemical resistance. The commercial pharmaceutical ampule glasses known up to now are in hydrolytic resistance class (H) 1 (in accordance with DIN ISO 719), acid resistance class (S) 1 (in accordance with DIN 12116) and alkali resistance class (L) 2 (in accordance with DIN ISO 695). This prior art is represented by the glass FIOLAX® clear, Code No. 8412 ($SiO_2$ 74.7; $B_2O_3$ 10.0; $Al_2O_3$ 5.0; $Na_2O$ 6.5; CaO 1.5; BaO 2.0; fluorides 0.3% by weight) and JENA$^{er}$ instrument glass Ggl 490/5 ($SiO_2$ 73.2; $B_2O_3$ 11.0; $Al_2O_3$ 5.3; $Na_2O$ 7.0; $K_2O$ 0.2; CaO 0.8; BaO 2.5% by weight), which have a weight loss of 100 mg/dm$^2$ (in accordance with DIN ISO 695). A class 1 alkali resistance, that is, a weight loss of <75 mg/dm$^2$, has so far not been achieved by commercial pharmaceutical ampule glasses.

However, an important requirement in the pharmaceutical industry is the provision of primary packaging materials having significantly improved alkali resistance to enable packaging of recently developed injection substances which exert a stronger alkaline attack on the container. Practical experience has shown that the development of glasses in the laboratory having weight losses of less than 65 to 70 mg/dm$^2$, that is, safely within alkali class 1, is required in order to maintain alkali resistance in the production process.

However, the achievement of this requirement must not impair the other important glass characteristics and glass production properties. For example, H=1 and S=1 must be maintained. Furthermore, the coefficient of linear thermal expansion $\alpha_{20/300}$ should be about $4.9 \times 10^{-6}$ K$^{-1}$, corresponding to that of the commercial glasses FIOLAX®clear, Code No. 8412 and Ggl 490/5. Also, for quality and cost reasons, the viscosity must not be too high over the entire melting, processing and cooling range.

An essential parameter for characterizing the processability of the glass is the processing temperature ($V_A$) at which the viscosity of the glass is 10$^4$ dPas. For pharmaceutical ampule glass, this $V_A$ value should not be more than 1220° C. to 1230° C. in order to prevent the occurrence of disadvantageous evaporation phenomena of glass components, principally alkali metal oxides and boric acid, and to save energy costs during production of tubes and during subsequent conversion of the tubes into ampules. Evaporation occurring during thermoforming of the glass can make the ampules unusable.

The glass viscosity in the cooling region is characterized by the glass transformation temperature $T_g$, which corresponds to a viscosity of approximately 10$^{13}$ dPas. This temperature should likewise not be too high, in order to save energy costs in the cooling region.

Pharmaceutical container glasses, as described in German patent publications 3,722,130 and DD 301,821, do not satisfy these high requirements.

Glasses having a composition as indicated in German patent publication 3,722,130 do not fall within alkali class 1. U.S. Pat. No. 5,459,110 discloses a lamp glass and fire protective glass having a specific composition and having an alkali resistance in class 1. Although L=1 is achieved by some glasses having a composition as described in DD 301,821, it is evident that, on the one hand, alkali resistance class 1 is only just achieved, if at all, and, on the other hand, the weight loss in the alkali resistance test shows scattered values when the melt having a certain composition is repeated a number of times, so that L=1 is not always achieved. Improvements are thus necessary here to obtain an alkali resistance reserve.

SUMMARY OF THE INVENTION

It is the object of the invention to provide borosilicate glasses of high chemical resistance and low viscosity, principally having class 1 hydrolyric resistance (in accordance with DIN ISO 719), class 1 acid resistance (in accordance with DIN 12116) and in particular, class 1 alkali resistance (in accordance with DIN ISO 659) with a weight loss of from <65 to 70 mg/dm$^2$, operating temperatures of <1220° C. to 1230° C. and a coefficient of linear thermal expansion of $\alpha_{20/300}$=4.8 to $5.0 \times 10^{-6}$ K$^{-1}$.

DESCRIPTION OF THE PREFERRED EMBODIMENTS OF THE INVENTION

The borosilicate glass composition of the invention is of high chemical resistance and low viscosity and contains zirconium oxide and lithium oxide. The glass composition includes in percent by weight on oxide basis: $SiO_2$ 73.0–75.0; $B_2O_3$ 7.0–10.0; $Al_2O_3$ 5.0–7.0; $ZrO_2$ 1.0–3.0; $Li_2O$ 0.5–1.5; $Na_2O$ 0–10.0; $K_2O$ 0–10.0; MgO 0–3.0; CaO 0–3.0; BaO 0–3.0; SrO 0–3.0; ZnO 0–3.0; fluorides 0–3.0; with $SiO_2/B_2O_3 \geq 7.5$; $\Sigma$ $SiO_2+Al_2O_3+ZrO_2$ 80.0–83.0; $\Sigma$ MgO+CaO+BaO+SrO+ZnO $\leq 3.0$.

Glasses having H=1, S=1, L=1 (weight loss <65 to 70 mg/dm$^2$), $V_A$ values of <1230° C. and $\alpha_{20/300}$ values of 4.8 to $5.0 \times 10^{-6}$ K$^{-1}$ can be produced in the range of compositions (% by weight, based on oxide), $SiO_2$ 73.0–75.0 (preferably 73.5–75.0); $B_2O_3$ 7.0–10.0 (preferably 8.0–10.0); $Al_2O_3$ 5.0–7.0 (preferably 5.0–6.0); $ZrO_2$ 1.0–3.0 (preferably 1.0–2.5); $Li_2O$ 0.5–1.5; $Na_2O$ 0–10.0; $K_2O$ 0–10.0; MgO 0–3.0; CaO 0–3.0; BaO 0–3.0; SrO 0–3.0; ZnO 0–3.0 and fluorides 0–3.0 if the ratio of the glass formers $SiO_2$ to $B_2O_3$ is $\geq 7.5$; the sum $SiO_2+Al_2O_3+ZrO_2$ is 80.0–83.0 percent by weight and the sum of the divalent additives MgO+CaO+BaO+SrO+ZnO is $\geq 3.0$ percent by weight. The sum of the alkali metal oxides $Li_2O+Na_2O+K_2O$ is preferably limited to 7.0–10.0 percent by weight.

The following composition range (% by weight, based on oxide) is particularly preferred: $SiO_2$ 73.5–75.0; $B_2O_3$ 8.0–10.0; $Al_2O_3$ 5.0–6.0; $ZrO_2$ 1.0–2.5; $Li_2O$ 0.5–1.5; $Na_2O$ 0.5–5.0; $K_2O$ 0.5–5.0; CaO 0.5–2.0, with $SiO_2/B_2O_3 \geq 7.5$; $\Sigma$ $SiO_2+Al_2O_3+ZrO_2$ 81.0–83.0; and $\Sigma$ $Li_2O+Na_2O+K_2O$ 7.0–9.5.

The glasses also have further advantageous properties which are essential for flaw-free and cost effective mass production. For example, they satisfy the requisite conditions placed on the melting behavior, the crystallization stability and demixing stability, the electrical conductivity, the corrosion behavior vis-a-vis refractory materials, the refining properties, the evaporation properties, et cetera.

Starting from the rounded composition of the common container glass type (in % by weight, based on oxide) $SiO_2$ 75; $B_2O_3$ 11; $Al_2O_3$ 5; $\Sigma$ $Na_2O+K_2O$ 7; $\Sigma$ BaO+CaO 2, the optimizations which have resulted in the composition of the invention are as explained below.

In order to achieve class 1 alkali resistance with a weight loss of from <65 to 70 mg/dm² and at the same time a relatively low processing temperature of $V_A$ <1220° C. to 1230° C., both $ZrO_2$ in an amount of from 1 to 3% by weight and $Li_2O$ (completely absent in German patent publication 3,722,130) in an amount of 0.5–1.5% by weight must be added to the borosilicate glass described above. In addition, the ratio between the glass formers $SiO_2$ and $B_2O_3$ must be greater than or equal to 7.5. The composition of the invention differs from those of German patent publications 3,722, 130 and DD 301,821 because of this ratio and because of the relatively low content of $B_2O_3$ (7.0–10.0 percent by weight).

By varying other components ($Al_2O_3$, alkali metal oxides, alkaline earth metal oxides or ZnO), the composition can be optimized, and the other important glass or glass production properties can be improved or matched.

The solution found is all the more surprising since the general borosilicate glass $SiO_2$—$B_2O_3$—$Al_2O_3$—$M_2O$—MO—AC (=additional components) has been known for some time, has been investigated scientifically on many occasions and is used in practice for a variety of applications.

Furthermore, optimization calculations based on linear models are unsuitable for determining this composition range with an advantageously high alkali resistance, since the alkali resistance of the glass does not increase in a linear manner with increasing $SiO_2/B_2O_3$ ratio. For this reason, a calculation of this type would not determine the range of low weight loss.

The addition of $ZrO_2$ and the small amount of $B_2O_3$ improve the resistance to water, acids and alkali. However, the addition of $ZrO_2$ is limited by its low solubility in the glass and the increase in the viscosity of the glass. The required reduction in the $B_2O_3$ content also causes an increase in viscosity, but this can be compensated by adding alkali metal oxides, in particular $Li_2O$.

When selecting the alkali metal oxides, various aspects should be considered: excessive amounts of $Li_2O$ in the glass melt cause an unacceptably strong attack on the refractory material of the melting chamber so that 0.5–1.5% by weight of $Li_2O$ represents an optimum. Just as $Li_2O$ evaporates less than $Na_2O$ from the melt of the borosilicate glass under consideration, the vapor pressure of $Na_2O$ is less than that of $K_2O$. This suggests (at the given maximum $Li_2O$ content) exclusive or predominant use of $Na_2O$. The lower costs of the $Na_2O$ raw materials are a further argument.

In particular applications of the glass of the invention, for example, the production of photomultiplier tubes, it is even imperative to omit the use of $K_2O$ entirely. This is because the $K_2O$ raw materials can contain extremely small amounts of radioactive impurities, which would under certain circumstances cause an increase in the noise level in the photomultiplier.

By contrast, larger amounts of $K_2O$ must be used in low-CaO and CaO-free synthetic variants in order to produce the desired $\alpha_{20/300}$ value.

For CaO-free syntheses, the following composition range (% by weight, based on oxide) is advantageous: $SiO_2$ 73.5–75.0; $B_2O_3$ 8.0–10.0; $Al_2O_3$ 5.0–6.0; $ZrO_2$ 1.0–2.5; $Li_2O$ 0.5–1.5; $Na_2O$ 0–3.0; $K_2O$ 4.0–7.0 with $SiO_2/B_2O_3 \geq 7.5$; $\Sigma SiO_2+Al_2O_3+ZrO_2$ 81.0–83.0; $\Sigma Li_2O+Na_2O+K_2O$ 7.0–10.0.

It is also known that a high $Na_2O$ content in the conversion of tubes into ampules by reheating the glass at high deformation temperatures can result particularly quickly in efflorescence on the glass surface. However, this can be countered simply by reducing the $V_A$ value by addition of $ZrO_2$ and $Li_2O$ and also by the sole use of $K_2O$ or the simultaneous use of $K_2O$ and $Na_2O$ and by addition of small amounts of ZnO.

The evaporation products in industrial borosilicate glasses, usually metaborates, have at high temperatures, independently of the type of alkali metal oxide ($M_2O$) used, a boric acid modulus of $\Psi=B_2O_3/(B_2O_3+M_2O)$ (in mol %) of from 0.53 to 0.58. This comes very close to the boric acid modulus of the glass composition, which makes evaporation easier. For this reason, it is necessary to reduce the evaporation during the melting process by other means, namely by a judicious increase in the viscosity.

This is achieved by means of relatively high contents of $SiO_2$ (73.0–75.0% by weight) and $Al_2O_3$ (5.0–7.0% by weight).

An $Al_2O_3$ content of this level represents a further distinction of the glass composition of the invention from the compositions of DD 301,821. The glass compositions of DE 4,230,607 also contain significantly less $Al_2O_3$, at 1.5–4.0% by weight.

If the proportion of the $SiO_2$ and $Al_2O_3$ is increased even further than according to the invention, the viscosity and thus also the $V_A$ value increase too much, which also impairs refining. High $Al_2O_3$ contents also result in a noticeable impairment of the acid resistance.

Taking into account all the advantageous and disadvantageous effects of the constituents of a high-quality, versatile pharmaceutical ampule glass of this type, the following glass composition (% by weight, based on oxide) has proven particularly advantageous: $SiO_2$ 74.0–74.5; $B_2O_3$ 8.5–9.5 (particularly preferable 9.0–9.5); $Al_2O_3$ 5.3–6.0 (particularly preferable 5.3–5.8); $ZrO_2$ 1.6–2.0; $Li_2O$ 0.7–1.3 (particularly preferable 0.9–1.1); $Na_2O$ 3.0–5.0; $K_2O$ 2.0–5.0 (particularly preferable 2.0–4.0); CaO 0.5–1.6 (particularly preferable 0.8–1.2); with $\Sigma SiO_2+Al_2O_3+ZrO_2$ 81.3–82.0; and $\Sigma Li_2O+Na_2O+K_2O$ 7.0–9.5 (particularly preferable 7.0–9.0).

Thus, at an $\alpha$ value of approximately $4.9\times10^{-6}$ K$^{-1}$, an excellent chemical resistance of H=1, S=1 and L=1 (weight loss <65 to 70 mg/dm²) and a $V_A$ value of as low as $\leq 1200°$ C. is achieved.

Since CaO has a stabilizing action on the acid resistance, small amounts should be present in the glass if possible. Small amounts of BaO are likewise helpful in order to further reduce viscosity and to lower the melting point. On the other hand, it may also be necessary for the glass to contain only very little BaO and CaO, or none at all, since it is known that these components can react in an undesired manner with some specific injection solutions.

If the respective pharmaceutical and industrial areas of application do not make the highest demands regarding chemical resistance, the glass properties can be further modified by addition of the further bivalent components SrO, MgO and ZnO and by varying the CaO and BaO proportions.

However, the total content of these components must remain restricted to a maximum of 3.0% by weight, whereby the composition of the invention differs from the composition disclosed in German patent publication 4,230,607 ($\Sigma$ MgO+CaO+BaO+ZnO+SrO+$ZrO_2$=6 to 10 $\triangle$ $\Sigma$ MgO+CaO+BaO+ZnO+SrO =3 to 9.5 with $ZrO_2$=0.5 to 3).

In addition, small amounts of fluorides can be added to the glass compositions of the invention in order to accelerate melting or to reduce the viscosity further. Also, known refining agents, such as chlorides and $Sb_2O_3$, can be added.

Examples of the invention are presented below.

Table 1 shows glass compositions of the invention and their essential properties relating to the invention.

It can be seen that, if the pregiven coefficient of thermal expansion of $\alpha_{20/300}=4.9\times10^{-6}$ $K^{-1}$ is maintained, the alkali resistance L, expressed by low weight loss values of from 58 to 65 $mg/dm^2$, is very safely within class 1, and the operating temperatures are low, with $V_A$ values from 1180° C. to 1220° C.

TABLE 1

Examples of glasses of the invention
(glass compositions in percent by weight)

| Glass Number | 1 | 2 | 3 | 4 | 5 |
|---|---|---|---|---|---|
| $SiO_2$ | 74.3 | 74.2 | 74.3 | 74.3 | 74.3 |
| $B_2O_3$ | 9.3 | 8.8 | 9.3 | 9.3 | 9.3 |
| $Al_2O_3$ | 5.5 | 5.8 | 5.5 | 5.5 | 5.5 |
| $ZrO_2$ | 1.8 | 1.8 | 1.8 | 1.8 | 1.8 |
| $Li_2O$ | 1.0 | 1.0 | 1.0 | 1.0 | 1.0 |
| $Na_2O$ | 4.0 | 3.0 | 3.5 | 3.0 | 2.0 |
| $K_2O$ | 3.0 | 4.0 | 3.8 | 4.6 | 6.1 |
| CaO | 1.1 | 1.4 | 0.8 | 0.5 | — |
| with | | | | | |
| $SiO_2/B_2O_3$ | 8.0 | 8.4 | 8.0 | 8.0 | 8.0 |
| $\Sigma\ SiO_2 + Al_2O_3 + ZrO_2$ | 81.6 | 81.8 | 81.6 | 81.6 | 81.6 |
| $\Sigma\ Li_2O + Na_2O + K_2O$ | 8.0 | 8.0 | 8.3 | 8.6 | 9.1 |
| Essential glass properties | | | | | |
| $\alpha_{20/300}$ ($10^{-6}\ K^{-1}$) | 4.9 | 4.9 | 4.9 | 4.9 | 4.9 |
| L ($mg/dm^2$) | 62 | 58 | 63 | 64 | 65 |
| $V_A$ (°C.) | 1180 | 1200 | 1190 | 1200 | 1220 |

The following data are given for Example 1 in order to demonstrate further advantageous properties:
Density ρ: 2.36 $g/cm^3$
Transformation temperature $T_g$: 540° C.
Annealing temperature or point (A.P.): 550° C.
Softening point $E_w$: 785° C.

Crystallization and demixing stability: adequate for flaw-free production of the glass as a mass-produced product.

The $T_g$ and A.P. temperatures confirm that the glass has a relatively low and thus favorable viscosity even in the cooling region so that inexpensive cooling is possible.

The glasses are produced in a conventional manner in a gas-heated laboratory furnace at 1620° C. in 0.5 liter crucibles over a period of about 4 hours, and are subsequently cast in metal molds to form blocks and are then cooled. The raw materials used were sand, $H_3BO_3$, $Al(OH)_3$, alkali and alkaline earth metal carbonates and nitrates, zirconium dioxide and ZnO. The glasses exhibited good melting behavior. The raw materials used can also be those usually used for industrial glasses.

The glass of the invention is principally suitable for use as a versatile primary packaging material for pharmaceuticals, for example, as ampule glass. It can also be used as instrument glass for laboratory and other technical applications.

It is understood that the foregoing description is that of the preferred embodiments of the invention and that various changes and modifications may be made thereto without departing from the spirit and scope of the invention as defined in the appended claims.

What is claimed is:

1. A borosilicate glass composition of high chemical resistance and low viscosity which contains zirconium oxide and lithium oxide, said glass composition comprising in percent by weight on oxide basis:

| | |
|---|---|
| $SiO_2$ | 73.0–75.0 |
| $B_2O_3$ | 7.0–10.0 |
| $Al_2O_3$ | 5.0–7.0 |
| $ZrO_2$ | 1.0–3.0 |
| $Li_2O$ | 0.5–1.5 |
| $Na_2O$ | 0–10.0 |
| $K_2O$ | 0–10.0 |
| MgO | 0–3.0 |
| CaO | 0–3.0 |
| BaO | 0–3.0 |
| SrO | 0–3.0 |
| ZnO | 0–3.0 |
| fluorides | 0–3.0 |
| with | |
| $SiO_2/B_2O_3$ | ≧7.5 |
| $\Sigma\ SiO_2 + Al_2O_3 + ZrO_2$ | 80.0–83.0 |
| $\Sigma\ MgO + CaO + BaO + SrO + ZnO$ | ≦3.0. |

2. The borosilicate glass composition of claim 1, comprising in percent by weight on oxide basis:

| | |
|---|---|
| $SiO_2$ | 73.5–75.0 |
| $B_2O_3$ | 8.0–10.0 |
| $Al_2O_3$ | 5.0–6.0 |
| $ZrO_2$ | 1.0–2.5 |
| $Li_2O$ | 0.5–1.5 |
| $Na_2O$ | 0–10.0 |
| $K_2O$ | 0–10.0 |
| MgO | 0–3.0 |
| CaO | 0–3.0 |
| BaO | 0–3.0 |
| SrO | 0–3.0 |
| ZnO | 0–3.0 |
| with | |
| $SiO_2/B_2O_3$ | ≧7.5 |
| $\Sigma\ SiO_2 + Al_2O_3 + ZrO_2$ | 80.0–83.0 |
| $\Sigma\ Li_2O + Na_2O + K_2O$ | 7.0–10.0 |
| $\Sigma\ MgO + CaO + BaO + SrO + ZnO$ | ≦3.0. |

3. The borosilicate glass composition of claim 2, comprising in percent by weight on oxide basis:

| | |
|---|---|
| $SiO_2$ | 73.5–75.0 |
| $B_2O_3$ | 8.0–10.0 |
| $Al_2O_3$ | 5.0–6.0 |
| $ZrO_2$ | 1.0–2.5 |
| $Li_2O$ | 0.5–1.5 |
| $Na_2O$ | 0.5–5.0 |
| $K_2O$ | 0.5–5.0 |
| CaO | 0.5–2.0 |
| with | |
| $SiO_2/B_2O_3$ | ≧7.5 |
| $\Sigma\ SiO_2 + Al_2O_3 + ZrO_2$ | 81.0–83.0 |
| $\Sigma\ Li_2O + Na_2O + K_2O$ | 7.0–9.5. |

4. The borosilicate glass composition of claim 2, comprising in percent by weight on oxide basis:

| | |
|---|---|
| $SiO_2$ | 73.5–75.0 |
| $B_2O_3$ | 8.0–10.0 |
| $Al_2O_3$ | 5.0–6.0 |
| $ZrO_2$ | 1.0–2.5 |
| $Li_2O$ | 0.5–1.5 |
| $Na_2O$ | 0–3.0 |
| $K_2O$ | 4.0–7.0 |
| with | |
| $SiO_2/B_2O_3$ | ≧7.5 |

|   |   |
|---|---|
| Σ SiO$_2$ + Al$_2$O$_3$ + ZrO$_2$ | 81.0–83.0 |
| Σ Li$_2$O + Na$_2$O + K$_2$O | 7.0–10.0. |

5. The borosilicate glass composition of claim 3, comprising in percent by weight on oxide basis:

|   |   |
|---|---|
| SiO$_2$ | 74.0–74.5 |
| B$_2$O$_3$ | 8.5–9.5 |
| Al$_2$O$_3$ | 5.3–6.0 |
| ZrO$_2$ | 1.6–2.0 |
| Li$_2$O | 0.7–1.3 |
| Na$_2$O | 3.0–5.0 |
| K$_2$O | 2.0–5.0 |
| CaO | 0.5–1.6 |
| with | |
| Σ SiO$_2$ + Al$_2$O$_3$ + ZrO$_2$ | 81.3–82.0 |
| Σ Li$_2$O + Na$_2$O + K$_2$O | 7.0–9.5. |

6. The borosilicate glass composition of claim 5, comprising in percent by weight on oxide basis:

|   |   |
|---|---|
| SiO$_2$ | 74.0–74.5 |
| B$_2$O$_3$ | 9.0–9.5 |
| Al$_2$O$_3$ | 5.3–5.8 |
| ZrO$_2$ | 1.6–2.0 |
| Li$_2$O | 0.9–1.1 |
| Na$_2$O | 3.0–5.0 |
| K$_2$O | 2.0–4.0 |
| CaO | 0.8–1.2 |
| with | |
| Σ SiO$_2$ + Al$_2$O$_3$ + ZrO$_2$ | 81.3–82.0 |
| Σ Li$_2$O + Na$_2$O + K$_2$O | 7.0–9.0. |

* * * * *

UNITED STATES PATENT AND TRADEMARK OFFICE
CERTIFICATE OF CORRECTION

PATENT NO. : 5,736,476
DATED : April 7, 1998
INVENTOR(S) : Eckhart Watzke, et. al.

It is certified that error appears in the above-identified patent and that said Letters Patent is hereby corrected as shown below:

In column 1, line 44: delete "$4.9=10^{-6}\ K^{-1}$" and substitute -- $4.9 \times 10^{-6}\ K^{-1}$ -- therefor.

In column 2, line 18: delete "hydrolyric" and substitute -- hydrolytic -- therefor.

In column 2, line 49: delete "is $\geq 3.0$" and substitute -- is $\leq 3.0$ -- therefor.

Signed and Sealed this

Thirtieth Day of June, 1998

Attest:

BRUCE LEHMAN

Attesting Officer

Commissioner of Patents and Trademarks